United States Patent [19]

Yoshida et al.

[11] Patent Number: 4,630,947

[45] Date of Patent: Dec. 23, 1986

[54] ENLARGED PATTERN GENERATOR

[75] Inventors: Kunio Yoshida, Nara; Fusao Makino, Kyoto, both of Japan

[73] Assignee: Sharp Kabushiki Kaisha, Osaka, Japan

[21] Appl. No.: 693,125

[22] Filed: Jan. 22, 1985

[30] Foreign Application Priority Data

Feb. 16, 1984 [JP] Japan ................... 59-28028

[51] Int. Cl.⁴ .................. B41J 11/44; H04N 1/21; H04N 1/17
[52] U.S. Cl. .................... 400/124; 400/76; 400/120; 358/180; 358/287; 358/298
[58] Field of Search .............. 400/120, 124, 76; 358/298, 283, 287, 296, 299, 302, 22, 77, 180

[56] References Cited

U.S. PATENT DOCUMENTS 4,201,488 5/1980 Gosset et al. ................ 400/124 X
4,394,693 7/1983 Shirley ....................... 400/124 X
4,503,469 3/1985 Kato ............................. 358/287
4,524,367 6/1985 Horiya et al. ................. 358/287

FOREIGN PATENT DOCUMENTS 47679 3/1982 Japan ............................. 400/120

Primary Examiner—Edgar S. Burr
Assistant Examiner—James R. McDaniel
Attorney, Agent, or Firm—Flehr, Hohbach, Test, Albritton & Herbert

[57] ABSTRACT

An enlarged pattern generator generates an enlarged dot matrix pattern from an original dot matrix pattern by providing up to four mutually adjacent dots. Presence and absence of neighboring dots are examined regarding each dot in the original dot matrix pattern in order to determine whether less than four dots should be provided in the enlarged pattern corresponding thereto.

7 Claims, 19 Drawing Figures

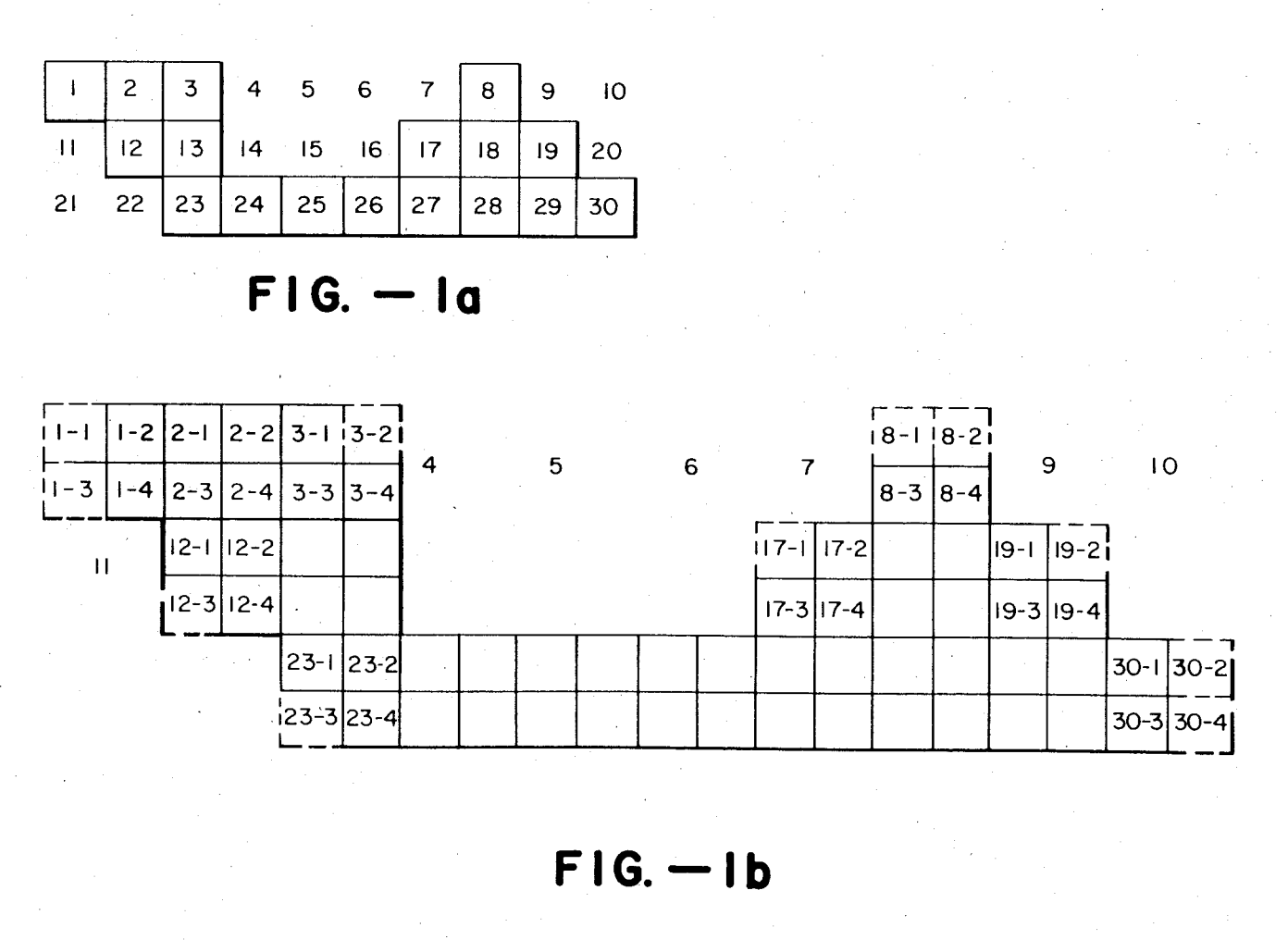

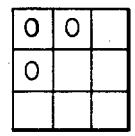  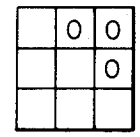 
FIG.–2a  FIG.–2a'  FIG.–2b  FIG.–2b'
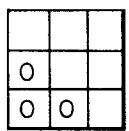  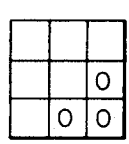 
FIG.–2c  FIG.–2c'  FIG.–2d  FIG.–2d'
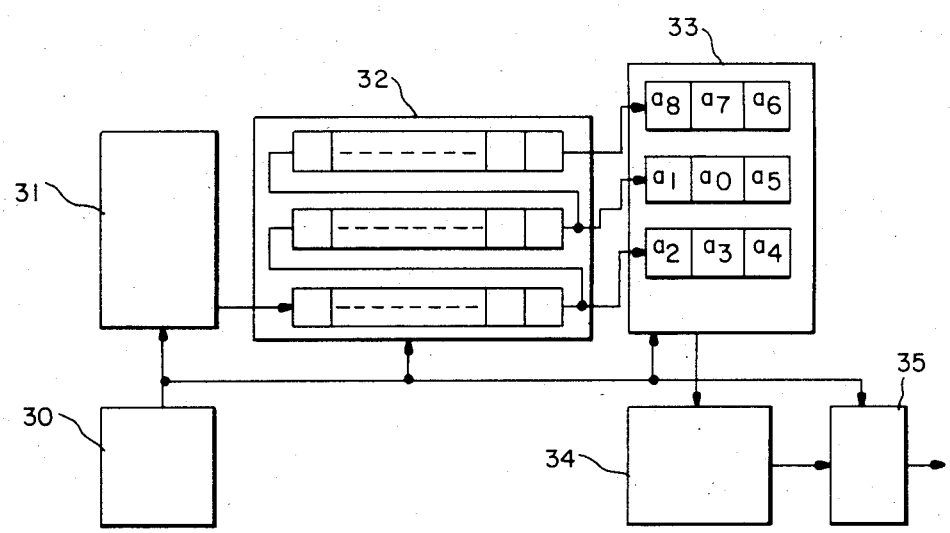
FIG.–3

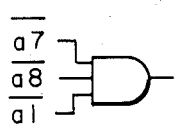
FIG.—4a
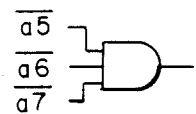
FIG.—4b
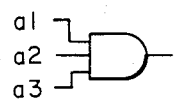
FIG.—4c
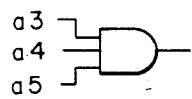
FIG.—4d
感
FIG.—5a
感
PRIOR ART
FIG.—6a
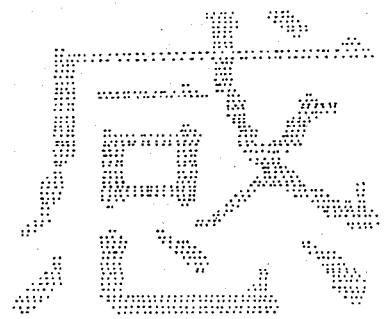
FIG.—5b
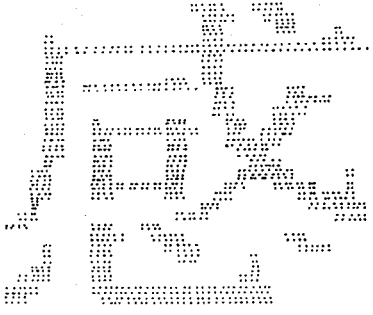
PRIOR ART
FIG.—6b

ENLARGED PATTERN GENERATOR

BACKGROUND OF THE INVENTION

This invention relates to an enlarged pattern generator for enlarging original dot matrix patterns of characters and symbols.

Together with the recent development in document processing technologies, characters of not only one size but of many sizes are frequently required now. It is extremely uneconomical, however, to store all these required character patterns individually because this will have the consequence of requiring an unnecessarily large storage space. In order to eliminate this problem, there has been developed a method according to which only a certain standard dot pattern is retained as the original and patterns of desired sizes are obtained by making enlargements of this standard pattern. By this method, however, characters which were simply enlarged proportionally from the original usually do not look natural because the intervals between lines or dots which form the pattern are also magnified. This is illustrated by FIGS. 6(a) and 6(b) which show an original pattern and an enlarged pattern, respectively.

In order to overcome this problem, use has been made of a method of adding extra dots (in the case of a pattern formed by dots) so as to fill such intervals. By this method, however, enlarged characters still frequently fail to look natural because some of the dots are added into areas where corrections are not needed.

It is therefore an object of this invention to provide an enlarged pattern generator which, when generating an enlarged pattern from a standard dot matrix pattern, makes pattern corrections not by adding dots but by deleting them.

BRIEF DESCRIPTION OF THE DRAWINGS

FIGS. 1(a) and 1(b) show by an example the principle the dot pattern processing according to the present invention.

FIGS. 2(a), 2(a'), 2(b), 2(b'), 2(c), 2(c'), 2(d) and 2(d') show how corrections are made according to the present invention.

FIG. 3 is a block diagram of a circuit for the operation of the present invention.

FIGS. 4(a), 4(b), 4(c) and 4(d) explain the logical operations of the gate circuit shown in FIG. 3.

FIGS. 5(a) and 5(b) show the effects of pattern enlargement by the method of the present invention.

FIGS. 6(a) and 6(b) show an example of pattern enlargement by a conventional method.

DESCRIPTION OF THE INVENTION

The principle of the method of the present invention will be explained by an example wherein dots are arranged in rectangular arrays in the mode of a square matrix. Let us suppose that some of the dots are "not illuminated" (dark) while the others are "illuminated" (bright) to describe a pattern. FIG. 1(a) shows an example of such a rectangular array (or matrix) of 30 dots, each represented by a dot number N (N being an integer between 1 and 30). Of these 30 dots, those with numbers enclosed in a square are intended to represent bright dots.

FIG. 1(b) is an enlarged matrix of dots corresponding to that of FIG. 1(a). A double-width, double-height enlargement is considered so that each dot N in the original matrix of FIG. 1(a) is now represented by 4 dots $N-1$, $N-2$, $N-3$ and $N-4$ in the enlarged matrix of FIG. 1(b). According to the conventional method described above, all 4 dots in the enlarged matrix corresponding to a bright dot in the original matrix (such as $N=1$ of FIG. 1(a)) would be "illuminated" and hence bright. According to the method of the present invention, however, not all of the 4 dots in the enlarged matrix corresponding to a bright dot in the original pattern are necessarily bright. Depending on the pattern, one or more of such 4 dots are made dark. In what follows, such dots on the enlarged matrix which would be bright according to the conventional method because they correspond to a bright dot in the original matrix but are made dark according to the method of the present invention, will be referred to as "corrected" dots, and the operation of keeping such dots dark in the enlarged matrix may be called "correction". Such corrected dots are identified on FIG. 1(b) by numbers surrounded by dotted lines. In both FIGS. 1(a) and (b), numbers not surrounded by lines represent dark dots.

FIG. 2 shows $3 \times 3$ matrices by means of which dots to be "corrected" are identified. The center element of each $3 \times 3$ matrix represent the status (dark or bright) of a dot in the original matrix of FIG. 1(a). The remaining eight elements show whether its eight neighboring dots (left-above, left, left-below, above, below, right-above, right and right-below) are bright or dark and this information determines whether the 4 dots corresponding to the bright dot of the original dot pattern represented by the center element should be allowed to remain bright (uncorrected) or be made dark (corrected).

If the bits representing the status of the 3 neighboring dots at the "left", "left-above" and "above" of one of the bright dots on the original pattern are all "0" (dark) as shown in FIG. 2(a), for example, the dot $N-1$ at "left-above" is made dark ("0") on the enlarged pattern as shown in FIG. 2(a'). Similarly, if the 3 neighboring dots "above", "right-above" and "right" are as shown in FIG. 2(b) the dot $N-2$ at "right-above" is made dark ("0") as shown in FIG. 2(b'). Situations of FIG. 2(c) and FIG. 2(d) respectively result in FIG. 2(c') and FIG. 2(d') on the enlarged pattern.

FIG. 3 shows a block diagram of a circuit which works out the correction logic of FIG. 2. The circuit comprises, as shown in FIG. 3, a clock and timing generator circuit, a character pattern memory 31, a shift register 32 adapted to store 3 lines of the character pattern, a three-bit shift register 33 of "serial-input and parallel-output" type for forming a correction matrix, a gate circuit 34 for determining a corrected pattern from the output of said three-bit shift register 33 and an output register 35 for the enlarged dot pattern with corrections according to the present invention.

FIG. 4 shows the logical circuits in the gate circuit 34 of FIG. 3 which, given the bit information $a_0, a_1, a_2, \ldots a_8$, output the negative logical products (NOT-AND) as follows: $\overline{a_1 . a_8 . a_7}$ as shown by FIG. 4(a), $\overline{a_5 . a_6 . a_7}$ as shown by FIG. 4(b), $\overline{a_1 . a_2 . a_3}$ as shown by FIG. 4(c) and $\overline{a_3 . a_4 . a_5}$ as shown by FIG. 4(d).

The original dot pattern shown by FIG. 1(a) is stored in the character pattern memory 31 and is transmitted by the timing generating circuit 30 to the shift register 32 in the order of dots $1, 2, 3, \ldots, 29, 30$. It will be assumed here that one-bit information "1" and "0" corresponds to each bright and dark dot, respectively. The shift register 32 is of sufficient length for storing three lines of the dot pattern and the output of the shift register 32 corresponding to each line is connected to the shift register 33 for forming a correction matrix. The information on dots 1, 2, ..., 30 of the original pattern transmitted to the shift register 32 is successively shifted. After ten shifts corresponding to one line, the information on dot 1 reaches $a_2$ of the register 33. After twenty-two additional shifts, information on dots 1, 2, 10, 11 and 12 are stored in $a_0$, $a_1$, $a_2$, $a_3$ and $a_4$, respectively.

In this situation, $a_5$, $a_6$ and $a_7$ are all "0" so that $\bar{a}_5.\bar{a}_6.\bar{a}_7=1$. This corresponds to FIG. 2(b) and hence the dot at right-above will not be illuminated (dark) as shown by FIG. 2(b'). Similarly, $\bar{a}_3.\bar{a}_4.\bar{a}_5=1$ corresponding to FIG. 2(d) and hence the dot at right-below remains dark as shown by FIG. 2(d').

By contrast, information "1" on dot 2 is in $a_1$ and information "1" on dot 12 is in $a_2$ of the register 33 so that $\bar{a}_1.\bar{a}_8.\bar{a}_7=\bar{a}_1.\bar{a}_2.\bar{a}_3=0$. Thus the four dots 1-1, 1-2, 1-3 and 1-4 on the enlarged pattern corresponding to dot 1 of the original pattern have "0", "1", "0" and "1", respectively and they are inputted into the output register 35. An output pattern device (not shown) is connected to the output register 35 and the pattern dots with bit information "1" are caused to remain dark, thus effecting the desired "corrections" according to the present invention. Similarly, dots 1-1, 1-3, 3-2, 8-1, 8-2, 12-3, 17-1, etc. surrounded by broken lines on the enlarged pattern of FIG. 1(b) are prevented from becoming "bright."

FIG. 5 illustrates the effects of these corrections by showing an original dot pattern (FIG. 5(a)) and its enlarged pattern (FIG. 5(b)). A comparison between FIG. 5(b) and FIG. 6(b) makes it clear that the character looks much more natural with the corrections according to the present invention.

This invention is applicable to double-width-and-height printing by a word processor and also to other types of character pattern printers such as laser printers. As described, an enlarged character generator of this invention can operate swiftly by means of a simple circuit structure and make visual recognition of characters and symbols easier by making characters appear smoother and hence more natural.

What is claimed is:

1. Apparatus for enlarging an original pattern on a dot matrix comprising
    means for defining four matrix positions corresponding to each dot included in said original pattern, and
    means for examining each dot included in said original pattern to determine whether three of the eight matrix positions adjacent to and surrounding said dot included in said original pattern are all unoccupied by dots belonging to said original pattern, said three positions being above, left-above and at left of said dot, or above, right-above and at right of said dot, or below, left-below and at left of said dot or below, right-below and at right of said dot.

2. The apparatus of claim 1 wherein said four matrix positions are in a quadrangular formation.

3. The apparatus of claim 1 further comprising means for excluding a dot from one of said four matrix positions if three mutually adjacent ones of said eight matrix positions corresponding to said one of said four matrix positions are unoccupied by dots belonging to said original pattern.

4. The apparatus of claim 1 further comprising memory means for storing said original pattern, and a three-bit shift register for storing information regarding presence and absence of dots adjacent a dot in said original dot matrix pattern.

5. A method of enlarging an original pattern on a dot matrix comprising the steps of providing a dot with eight surrounding adjacent positions
    defining four matrix positions in a quadrangular formation each corresponding to each dot included in said original pattern and three of the surrounding adjacent patterns, and
    placing a dot at each of said four matrix positions except where three mutually adjacent ones of the eight positions adjacent to and surrounding a dot in said original pattern are unoccupied.

6. The method of claim 5 wherein said four matrix positions are left-above, left-below, right-above and right-below.

7. The method of claim 6 wherein said placing step comprises excepting said left-above position if three positions adjacent to said each dot included in said original pattern at the left, left-above and above are all unoccupied, said left-below position if three positions adjacent to excepting said each dot included in said original pattern at the left, left-below and below are all unoccupied, said right-above position if three positions adjacent to said each dot included in excepting said original pattern at the right, right-above and above are all unoccupied and said right-below position if three positions adjacent to excepting said each dot included in said original pattern at the right, right-below and below are all unoccupied.

* * * * *